US012586840B2

(12) United States Patent
Zhang et al.

(10) Patent No.: US 12,586,840 B2
(45) Date of Patent: Mar. 24, 2026

(54) COOLING PLATE ASSEMBLY, LIQUID COOLING MODULE AND BATTERY PACK

(71) Applicant: EVE POWER CO., LTD., Jingmen (CN)

(72) Inventors: Tengfei Zhang, Jingmen (CN); Jie Tang, Jingmen (CN); Bohao Xu, Jingmen (CN); Pan Liu, Jingmen (CN); Jibing Jiang, Jingmen (CN); Chengming Zhao, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 581 days.

(21) Appl. No.: 18/148,732

(22) Filed: Dec. 30, 2022

(65) Prior Publication Data

US 2023/0238607 A1 Jul. 27, 2023

Related U.S. Application Data

(63) Continuation of application No. PCT/CN2022/129244, filed on Nov. 2, 2022.

(30) Foreign Application Priority Data

Jan. 26, 2022 (CN) ......................... 202210092106.3
Jan. 26, 2022 (CN) ......................... 202220213350.6

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/617* (2015.04);
(Continued)

(58) Field of Classification Search
CPC ........... H01M 10/6556; H01M 10/613; H01M 10/617; H01M 10/643; H01M 10/6555;
(Continued)

(56) References Cited

U.S. PATENT DOCUMENTS

2018/0352686 A1* 12/2018 Song .................. H05K 7/20927

FOREIGN PATENT DOCUMENTS

| CN | 105932353 | A | * | 9/2016 | .......... | H01M 10/613 |
| CN | 108390126 | A | * | 8/2018 | .......... | H01M 10/653 |
| CN | 207947365 | U | * | 10/2018 | ............. | Y02E 60/10 |
| CN | 108869830 | A | * | 11/2018 | ............. | F25B 41/31 |
| CN | 209544555 | U | * | 10/2019 | ............. | Y02E 60/10 |
| CN | 210120215 | U | * | 2/2020 | ............. | Y02E 60/10 |

(Continued)

*Primary Examiner* — Kaity V Chandler
(74) *Attorney, Agent, or Firm* — Sughrue Mion, PLLC

(57) ABSTRACT

The application discloses a cooling plate assembly, a liquid cooling module and a battery pack, which include a connector and two groups of cooling pipe assemblies, each group of cooling flow channels includes a first flow channel and a second flow channel penetrating along a first direction and the connector is provided with a third flow channel and a fourth flow channel penetrating along a second direction, wherein the first flow channel is communicated with the third flow channel, and the second flow channel is communicated with the fourth flow channel; the two groups of cooling pipe assemblies are respectively communicated with the first flow channel and the second flow channel on the same side of the connector; between the third flow channel and the fourth flow channel, one is set as liquid inlet and the other is set as liquid outlet.

19 Claims, 3 Drawing Sheets

100

(51) Int. Cl.

| | |
|---|---|
| *H01M 10/617* | (2014.01) |
| *H01M 10/643* | (2014.01) |
| *H01M 10/6555* | (2014.01) |
| *H01M 10/6568* | (2014.01) |

(52) U.S. Cl.

CPC ..... *H01M 10/643* (2015.04); *H01M 10/6555* (2015.04); *H01M 10/6568* (2015.04)

(58) Field of Classification Search

CPC .......... H01M 10/6568; H01M 10/647; H01M 50/213; H01M 10/625; H01M 10/6554; H01M 10/6557; H01M 10/6567; F28F 1/006; F28F 1/025; F28F 9/0246; F28F 9/26; F28D 2021/0029; F28D 2021/0043; F28D 1/05358; Y02E 60/10

See application file for complete search history.

(56) References Cited

FOREIGN PATENT DOCUMENTS

| | | | | | | |
|---|---|---|---|---|---|---|
| CN | 212136644 | U | * | 12/2020 | ............. | Y02E 60/10 |
| CN | 112448082 | A | * | 3/2021 | ........ | H01M 10/6555 |
| CN | 112736324 | A | * | 4/2021 | ........ | H01M 10/6557 |
| CN | 213816252 | U | * | 7/2021 | ............. | Y02E 60/10 |
| CN | 214313326 | U | * | 9/2021 | ............. | Y02E 60/10 |
| CN | 108847509 | B | * | 10/2021 | ........ | H01M 10/6556 |
| CN | 114267901 | A | * | 4/2022 | ............. | Y02E 60/10 |
| CN | 114628816 | A | * | 6/2022 | .......... | H01M 10/643 |
| JP | 2012190674 | A | * | 10/2012 | ............. | Y02E 60/10 |
| JP | 2016161158 | A | * | 9/2016 | ........ | H01M 10/6567 |
| KR | 20210104452 | A | * | 8/2021 | ........ | H01M 10/6556 |
| TR | 201107319 | A2 | * | 1/2012 | .......... | H01M 50/293 |

* cited by examiner

100

COOLING PLATE ASSEMBLY, LIQUID COOLING MODULE AND BATTERY PACK

This application is a continuation of International Patent Application No. PCT/CN2022/129244, filed on Nov. 2, 2022, pending, which claims the priority of China Patent Application No. 202210092106,3 filed in China Patent Office on Jan. 26, 2022, the entire contents of which are hereby incorporated by reference.

TECHNICAL FIELD

The application relates to the technical field of power batteries, such as a cooling plate assembly, a liquid cooling module and a battery pack.

BACKGROUND ART

At present, in the power battery industry, battery packs include cylindrical battery cells, and most of them are cooled by cooling pipes. However, common cooling pipes have two disadvantages: first, the cooling effect of the cylindrical battery cells located at the water inlet of the cooling pipe is good, while the cooling effect of the cylindrical battery cells located at the water outlet is poor, resulting in large temperature difference of the whole battery pack and uneven performance of different cylindrical battery cells; Second, the high difficulty in assembling the series cooling pipes leads to low yield; However, the space utilization rate of parallel cooling pipes is low, too many water inlet and outlet pipes cause large volume and occupy more space, which leads to low energy density of battery packs, and when side collision occurs, the risk of leakage is great, which leads to poor grouping ability and high cost of battery packs.

SUMMARY OF THE INVENTION

The invention provides a cooling plate assembly, a liquid cooling module and a battery pack, which improve the temperature equalization performance of cylindrical battery cells, reduce the temperature difference between the upper and lower sides of the same cylindrical battery cell, reduce the temperature difference between cylindrical battery cells in the same row, reduce the temperature difference between cylindrical cells in different rows, and improve the cooling effect. It reduces the occupied space of the battery pack, improves the energy density of the battery pack, simplifies the structure and reduces the cost.

On the first aspect, the embodiment of the application provides a cooling plate assembly, which includes:

a connector, wherein the connector is provided with at least one group of cooling flow channels, and each group of cooling flow channels includes a first flow channel and a second flow channel penetrating along a first direction, and the connector is provided with a third flow channel and a fourth flow channel penetrating along a second direction, wherein the first flow channel is communicated with the third channel, and the second channel is communicated with the fourth flow channel;

Two groups of cooling pipe assemblies corresponding to each group of cooling flow channels are respectively arranged on both sides of the connector along the first direction, and the two groups of cooling pipe assemblies are respectively communicated with the first flow channel and the second channel located on the same side of the connector; of the third flow channel and the fourth flow channel, one is set as liquid inlet and the other is set as liquid outlet.

In one embodiment, the third flow channel and the fourth flow channel can be alternately arranged as liquid inlet and liquid outlet.

In one embodiment, each group of the cooling pipe assemblies includes:

a first cooling pipe and a second cooling pipe, wherein the first end of the first cooling pipe is connected to the first flow channel, and the first end of the second cooling pipe is connected to the second flow channel;

A liquid collecting pipe, the second end of the first cooling pipe and the second end of the second cooling pipe are respectively connected to the liquid collecting pipe.

In one embodiment, the first flow channel and the second flow channel are arranged along the third direction (Z) of the connector.

In one embodiment, a plurality of pipes are respectively arranged in the first cooling pipe and the second cooling pipe.

In one embodiment, the first cooling pipe and the second cooling pipe are both serpentine pipes, and the shapes of the serpentine pipes are all matched with the cylindrical battery cells.

In one embodiment, the outer surface of the cooling pipe assembly is provided with a heat conducting structure layer.

In one embodiment, two ends of the connector along the third direction (Z) are respectively provided with connecting members, and two of the connectors can be connected by the connecting members.

In the second aspect, the embodiment of the application provides a liquid cooling module, which includes the above-mentioned cooling plate assemblies, and the cooling plate assembly is provided with a plurality, wherein a plurality of cooling plate assemblies are sequentially connected in the second direction(Y) by the connector, the third flow channels of the plurality of cooling plate assemblies are communicated to form a first cooling liquid channel, and the fourth flow channels of the plurality of cooling plate assemblies are communicated to form a second cooling liquid channel.

In one embodiment, the connectors of two cooling plate assemblies located at the two ends of the plurality of cooling plate assemblies sequentially connected are defined as a head-end connector and a tail-end connector, respectively;

Among the third flow channel and the fourth flow channel of the head-end connector and the third flow channel and the fourth flow channel of the tail-end connector, block the third flow channel of any one of the head-end connector and the tail-end connector and the fourth flow channel of any one of the head-end connector and the tail-end connector. And between the third flow channel of the other of the head-end connector and the tail-end connector and the fourth flow channel of the other of the head-end connector and the tail-end connector, one is arranged to communicate with the external liquid inlet device, and the other is arranged to communicate with the external liquid outlet device.

In one embodiment, the third flow channel and the fourth flow channel of the head-end connector are both blocked, and the third flow channel and the fourth flow channel of the tail-end connector are respectively communicated with the outside; or the third flow channel and the fourth flow channel of the tail-end connector are both blocked, and the third flow channel and the fourth flow channel of the head-end connector are respectively communicated with the outside.

In one embodiment, the connectors are also provided with plugs, and the plugs can respectively connect the third flow channels of two adjacent connectors and the fourth flow channels of two adjacent connectors.

In one embodiment, the first ends of the third flow channel and the fourth flow channel on one side of one connector are respectively fixedly connected to the first ends of the plugs, and the second ends of the two plugs can be detachably connected to the second ends of the third flow channel and the fourth flow channel of the other connector.

In one embodiment, when a plurality of the cooling plate assemblies are arranged along the third direction, two adjacent groups of the cooling plate assemblies are sequentially connected along the third direction through the connector.

In a third aspect, one embodiment of the present application provides a battery pack including the liquid cooling module mentioned above.

In one embodiment, the liquid cooling modules are provided with one or more groups, and when the liquid cooling modules are provided with multiple groups, multiple groups of the liquid cooling modules are arranged along the third direction (Z), and two adjacent groups of the liquid cooling modules are connected by the connector.

Beneficial effects of embodiments of the application:

A cooling plate assembly provided by the embodiment of the application, when cooling, the cooling liquid enters the connector through the third flow channel, then flows back into the connector through the cooling pipe assemblies and the second flow channel, and is discharged through the fourth flow channel; In this process, cooling liquid is simultaneously introduced into the cooling pipe assemblies on both sides, so that the cylindrical battery cells on both sides are cooled at the same time, and the temperature uniformity of the cylindrical battery cells on both sides is improved.

The liquid cooling module provided by the embodiment of the application reduces the temperature difference of the same row of cylindrical battery cells on both sides of the connector, and also reduces the temperature difference of the upper and lower sides of the cylindrical battery cells by adopting the above cooling plate assemblies; and a plurality of cooling plate assemblies are connected in parallel, so that the temperature difference between the cylindrical battery cells in different rows is reduced, thereby improving the temperature uniformity of the cylindrical battery cells and further improving the reliability. When the thermal management system of the battery starts to operate, the cooling liquid passes through the external liquid storage device and enters the connector of the cooling plate assembly at the end through the third flow channel at the connector side of the cooling plate assembly at the end; On the one hand, the first cooling liquid channel formed by connecting a plurality of connectors through a plurality of the third flow channels is a cooling liquid inlet channel, and the cooling liquid sequentially enters the connectors of each cooling plate assembly; On the other hand, the cooling liquid entering the connector enters the first ends of the cooling pipe assemblies on both sides from the first flow channel of the connector; Then enters the connector from the second end of the cooling pipe assembly and the second flow channel, and the cooling liquid of a plurality of cooling plate assemblies sequentially flows out through the fourth flow channel; the second cooling liquid channel formed by connecting a plurality of connectors through the fourth flow channel is a cooling liquid outlet channel, and finally flows out from the fourth flow channel at the end; For example, the fourth flow channel of the connector of the cooling plate assembly at the end is connected with an external collecting device, which is arranged to collect the cooling liquid.

Each cooling plate assembly is connected by a connector, and the connector at the end is connected with an external liquid outlet device and an external collecting device respectively, and the first cooling liquid channel and the second cooling liquid channel formed by the connector connection enter and exit the cooling liquid, so that the traditional water inlet and outlet pipe structure is abandoned, the structure is simplified, the space is saved, the volume utilization rate of the battery pack is improved, the assembly difficulty is reduced, and the cost is reduced. And the connector is arranged at the middle position of the liquid cooling module, so that the two sides of the battery pack do not have a long structure of the main water inlet and outlet pipe, and the risk of leakage of the cooling liquid when the battery pack is bumped sideways is reduced.

The battery pack provided by the embodiment of the application has better cooling effect, improves the space utilization rate, can improve the energy density, simplify the structure, reduce the overall weight, is convenient to assemble, and has the advantage of rapid mass production.

100: cooling plate assembly;

1: connector; 111: the first flow channel; 112: the second flow channel; 113: the third flow channel; 114: The fourth flow channel; 12: plug;

2: cooling pipe assembly; 21: the first cooling pipe; 22: the second cooling pipe; 23: liquid collecting pipe; 31: the fifth flow channel; 32: the sixth flow channel.

DETAILED DESCRIPTION OF THE INVENTION

In the description of this application, unless otherwise specified and limited, the terms "connected", "link" and "fixed" should be understood broadly, for example, they can be fixed connections, detachable connections or integrated; Can be mechanically connection or electrically connection; It can be directly connected or indirectly connected through an intermediate medium, and it can be the internal communication of two elements or the interaction between two elements. For those of ordinary skill in the art, the meanings of the above terms in this application can be understood according to the situation.

In the present application, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

Figure 1:
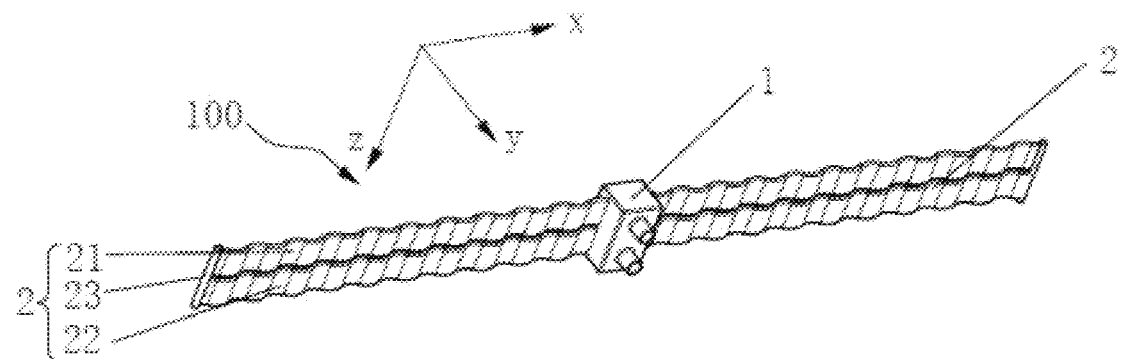
FIG. 1 is a structural schematic diagram of a cooling plate assembly provided by a specific embodiment of the present application.
Figure 2:
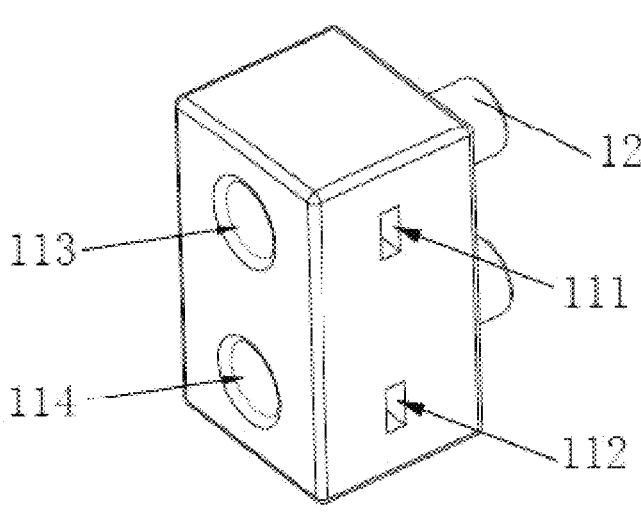
FIG. 2 is a schematic structural diagram of the connector provided by the specific embodiment of the present application.
Figures 3, 4:
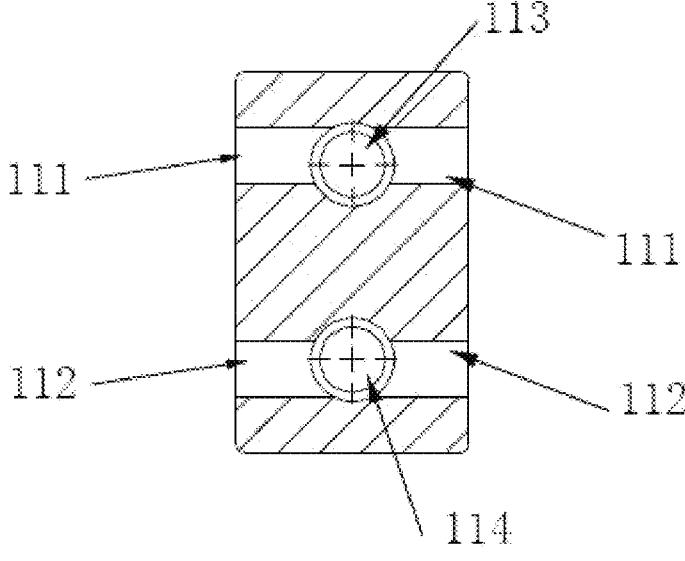
FIG. 3 is a cross-sectional view of a connector provided by a specific embodiment of the present application.
FIG. 4 is a schematic structural diagram of a liquid collecting pipe provided by the specific embodiment of the present application.

This embodiment provides a cooling plate assembly. As shown in FIGS. 1-3, the cooling plate assembly includes a connector 1 and a cooling pipe assembly 2. For example, the connector 1 is provided with at least one group of cooling flow channels, each group of which includes a first flow channel 111 and a second flow channel 112 penetrating along the first direction. The connector 1 is provided with a third flow channel 113 and a fourth flow channel 114 penetrating along the second direction, and the first flow channel 111 communicates with the third flow channel 113. Two groups of cooling pipe assemblies 2 arranged corresponding to each group of cooling flow channels, the two groups of cooling pipe assemblies 2 are respectively arranged on both sides of the connector 1 along the first direction, and the two groups of cooling pipe assemblies 2 are respectively communicated with the first flow channel 111 and the second flow channel 112 on the same side of the connector 1; One of the third flow channel 113 and the fourth flow channel 114 is set as liquid inlet, and the other is set as liquid outlet.

In this embodiment, as shown in FIG. 1, the first direction is X, the second direction is Y, the third direction is Z, and the third direction, the first direction and the second direction are perpendicular to each other.

During cooling, the cooling liquid enters the connector 1 through the third flow channel 113, then enters the cooling pipe assemblies 2 on both sides through the first flow channel 111, then flows back into the connector 1 through the cooling pipe assemblies 2 and the second flow channel 112, and is discharged through the fourth flow channel 114. In this process, cooling liquid is simultaneously introduced into the cooling pipe assemblies 2 on both sides, so that the cylindrical battery cells on both sides are cooled at the same time, and the temperature uniformity of the cylindrical battery cells on both sides is improved.

For example, the third flow channel 113 and the fourth flow channel 114 can be alternately set as liquid inlet and liquid outlet, so that both ends of the cooling pipe assembly 2 can be alternately fed and discharged, and the cooling liquid can be alternately circulated in two directions, thus improving the temperature uniformity of the upper and lower sides of the cylindrical batter cell. The case of the fourth flow channel 114 is set for liquid inlet and the third flow channel 113 is set for liquid outlet, can refer to the case of the third flow channel 113 for liquid inlet and the fourth flow channel 114 for liquid outlet, which will not be described again. For example, the third flow channel 113 can be set as liquid inlet and the fourth flow channel 114 can be set as liquid outlet. After half an hour, the third channel 113 is set as liquid outlet and the fourth channel 114 is set as liquid inlet. The interval time of alternating liquid in and out can be set according to the working conditions, and there is no limit. During the whole thermal management process, the heat exchanged by each cylindrical battery cell is basically the same, and the heat exchanged by the upper and lower sides of the cylindrical battery cell is basically the same, which reduces the temperature difference and improves the reliability.

In this embodiment, as shown in FIGS. 1-3, the connector 1 is provided with a set of cooling flow channels, and the cooling plate assembly includes two groups of cooling pipe assemblies 2. In other embodiments, the connector 1 may be provided with a plurality of groups of cooling flow channels. Taking two groups of cooling flow channels as an example, if the connector 1 is provided with two groups of cooling flow channels, four groups of cooling pipe assemblies 2 are correspondingly provided. For example, when two groups of cooling flow channels are arranged along the third direction, two groups of cooling pipe assemblies 2 are arranged along the third direction on each side, which can improve the temperature uniformity of the cylindrical battery cell.

For example, as shown in FIG. 1, the cooling pipe assembly 2 includes a header pipe 23, a first cooling pipe 21 and a second cooling pipe 22, wherein the first end of the first cooling pipe 21 is connected to the first flow channel 111 and the first end of the second cooling pipe 22 is connected to the second flow channel 112; The second end of the first cooling pipe 21 and the second end of the second cooling pipe 22 are connected to the liquid collecting pipe 23, respectively. The cooling liquid flows through the first flow channel 111, the first cooling pipe 21, the liquid collecting pipe 23, the second cooling pipe 22 and the second flow channel 112 in turn, or vice versa, and the first cooling pipe 21 and the second cooling pipe 22 are connected through the liquid collecting pipe 23, so that the upper and lower sides of the cylindrical cell are simultaneously cooled. The cooling pipe assembly 2 is arranged separately, which is convenient for processing and assembly and reduces the cost.

The cooling plate assembly 100 is divided into upper and lower parts along the third direction, which can cool the upper and lower sides of the cylindrical cell. When the cooling liquid flows along the cooling plate assembly 100, the temperature will gradually increase due to the absorption of heat, so that the temperature of the cooling liquid in the liquid inlet part (the upper/lower side of the third party) of the cooling plate assembly 100 will gradually increase from one end close to the connector 1 to the direction away from the connector 1. The temperature of the cooling liquid in the outlet part (the lower/upper side of the third party) gradually rises from one end far away from the connector 1 to the direction close to the connector 1, which can ensure the temperature uniformity of each cylindrical cell, for example, it is applicable to the case where the height of the cylindrical battery cells is high.

For example, as shown in FIG. 4, the liquid collecting pipe 23 includes a fifth flow channel 231 and a sixth flow channel 232 which are communicated with each other, the first cooling pipe 21 is communicated with the fifth flow channel 231, and the second cooling pipe 22 is communicated with the sixth flow channel 232. The cooling liquid flows through the third flow channel 113, the first flow channel 111, the first cooling pipe 21, the fifth flow channel 231, the liquid collecting pipe 23, the sixth flow channel 232, the second cooling pipe 22, the second flow channel 112 and the fourth channel 114 in turn, or circulates in the opposite direction.

For example, the liquid collecting pipe 23 has a cavity structure, and the fifth flow channel 231 and the sixth flow channel 232 are communicated with each other through the cavity structure. The material is not limited, so long as it can be connected with the first cooling pipe 21 and the second cooling pipe 22 respectively. For example, the liquid collecting pipe 23 can be communicated with the first cooling pipe 21 and the second cooling pipe 22 by welding, bonding, or other connection processes. As long as the liquid collecting pipe 23 can connect with the first cooling pipe 21 and the second cooling pipe 22, the volume should be reduced as much as possible to save space, and it can be designed according to the internal space of the battery pack, without limitation.

For example, referring to FIGS. 1 and 2, the first flow channel 111 and the second flow channel 112 are arranged along the third direction of the connector 1.

For example, the first cooling pipe 21 and the second cooling pipe 22 play the role of cooling the cylindrical battery cell, and they can be made of metal materials such as aluminum alloy, steel, copper alloy or materials with good thermal conductivity, without limitation. For example, a plurality of pipes are respectively arranged in the first cooling pipe 21 and the second cooling pipe 22, which improves the uniformity of cooling liquid introduced into the first cooling pipe 21 and the second cooling pipe 22, and further improves the cooling effect along the third direction of the cylindrical battery cell.

In this embodiment, the cooling pipe assembly 2 and the connector 1 can be welded. In other embodiments, the cooling pipe assembly 2 and the connector 1 are detachably connected to facilitate assembly; For example, the cooling pipe assembly 2 may be located only on one side of the connector 1, and the first flow channel 111 and the second flow channel 112 on the other side may be blocked, so that the connector 1 is located at one end, which can be set according to the actual situation.

For example, the first cooling pipe and the second cooling pipe are both serpentine pipes, and the shape of the serpentine pipe is matched with the cylindrical battery cell, so that the contact area between the cooling pipe assembly 2 and the cylindrical battery cell is increased, and the cooling effect is improved. For example, the first cooling pipe 21 and the second cooling pipe 22 are respectively provided with a plurality of circular arc surfaces, and the radian of the circular arc surfaces is matched with that of the cylindrical battery cell.

For example, the outer surface of the cooling pipe assembly 2 is provided with a heat-conducting structural layer, which can increase the bonding tightness between the cooling pipe assembly 2 and the cylindrical battery cell, so that the heat generated by the cylindrical cell is conducted to the cooling pipe assembly 2 through the heat-conducting structural layer, and the heat on the cooling pipe assembly 2 is taken away by the cooling liquid in its own pipeline, thus improving the cooling effect. For example, the heat-conducting structural layer is made of heat-conducting structural adhesive, which has a good heat-conducting effect, improves the structural installation reliability, and plays a dual role of heat conduction and structural fixation.

For example, the two ends of the connector 1 in the third direction are respectively provided with connectors, and two connectors 1 can be connected by the connectors. When a plurality of cooling plate assemblies are arranged in the third direction, two adjacent connectors 1 in the third direction are connected by connecting members, for example, the connecting members can be plugs and sockets, one end of the connector 1 is provided with a plug 12, and the other end is provided with a socket, and the two connectors 1 are connected by plug and socket. In other embodiments, the connectors can be connected according to the relevant technologies, so that the two connectors 1 can be connected without limitation.

For example, when the height of the cylindrical battery cell is large, a plurality of groups of cooling plate assemblies can be arranged along the third direction for cooling the cylindrical battery cell.

Figure 5:
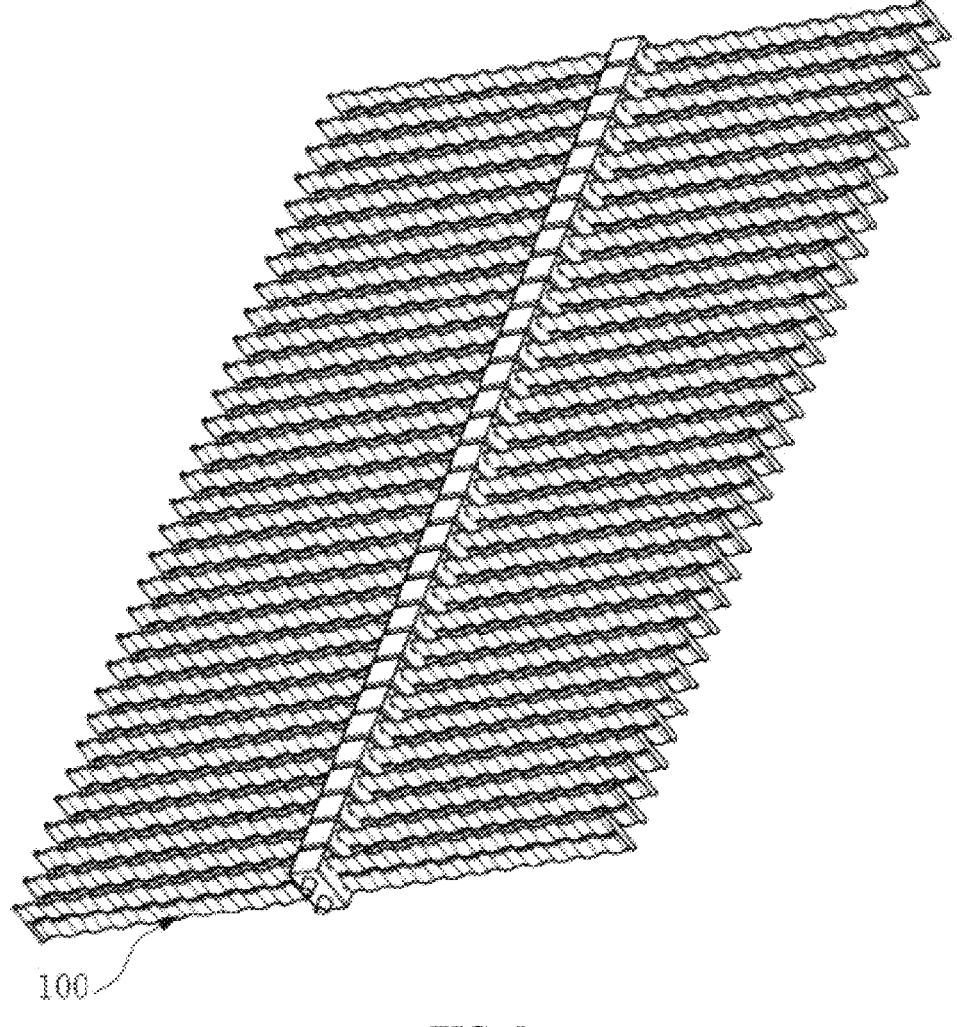
FIG. 5 is a schematic structural diagram of a liquid cooling module provided by the specific embodiment of the present application.

For example, as shown in FIG. 5, a plurality of cooling plate assemblies are arranged in the second direction to form a layer, and when a layer of cylindrical battery cells is arranged, a layer of cooling plate assemblies is arranged to cool a layer of cylindrical battery cells; When a plurality of layers of cylindrical battery cells are arranged, each layer of cylindrical battery cells is cooled by a layer of cooling plate assembly, and the connectors 1 of each layer are connected with the connectors 1 of the other layer in the multi-layer cooling plate assembly to ensure the stability of the mechanical structure connection and improve the connection reliability.

This embodiment also provides a liquid cooling module, as shown in FIG. 5, which includes a plurality of cooling plate assemblies 100; For example, a plurality of cooling plate assemblies are sequentially connected in the second direction by the connector 1, the third flow channels 113 of the cooling plate assemblies are communicated to form a first cooling liquid channel, and the fourth flow channels 114 of the cooling plate assemblies are communicated to form a second cooling liquid channel.

For example, the cooling plate assemblies 100 are arranged near the cylindrical battery cells, and the cooling plate assemblies 100 can be arranged between two adjacent rows of cylindrical battery cells. Multiple groups of cooling plate assemblies 100 are connected in parallel through the connector 1, and the cooling plate assemblies 100 are arranged to cool multiple rows of cylindrical battery cells. When the thermal management system of the battery starts to operate, the cooling liquid passes through the external liquid storage device and enters the connector 1 of the cooling plate assembly 100 at the end through the third flow channel 113 at one side of the connector 1. On the one hand, the first cooling flow channel formed by connecting a plurality of connectors 1 through a plurality of third flow channels 113 is a cooling inlet channel, and the cooling sequentially enters the connectors 1 of each cooling plate assembly 100; On the other hand, the cooling entering the connector 1 enters the first ends of the cooling pipe assemblies 2 on both sides from the first flow channel 111 of the connector 1; Then, it enters the connector 1 from the second end of the cooling pipe assembly 2 and the second flow channel 112, and the cooling liquid of each cooling plate assembly 100 flows out through the fourth flow channel 114 in turn. The second cooling liquid channel formed by connecting a plurality of connectors 1 through the fourth flow channel 114 is the cooling liquid outlet channel, and the cooling liquid flows out from the fourth flow channel 114 at the end. For example, the fourth flow channel 114 of the connector 1 of the cooling plate assembly 100 located at the end is connected with an external collecting device, which is arranged to collect the cooling liquid.

Each cooling plate assembly 100 is connected by a connector 1, and the connector 1 at the end is connected with an external liquid outlet device and an external collecting device respectively, and the first cooling liquid channel and the second cooling liquid channel formed by the connector 1 are connected to feed and discharge cooling liquid, so that the traditional water inlet and outlet pipe structure is abandoned, the structure is simplified, the space is saved, the volume utilization rate of the battery pack is improved, the assembly difficulty is reduced, and the cost is reduced. And the connector 1 is arranged at the middle position of the liquid cooling module, so that the two sides of the battery pack do not have a long structure of the main water inlet and outlet pipe, and the risk of leakage of the cooling liquid when the battery pack is bumped sideways is reduced.

A plurality of cooling plate assemblies 100 are connected in parallel, which reduces the temperature difference between different rows of cylindrical battery cells; By adopting the cooling plate assembly 100, the temperature difference between the cylindrical battery cells in the same row and located on both sides of the connector 1 is reduced, and the temperature difference between the upper and lower sides of the cylindrical battery cells is also reduced, so that the temperature uniformity of a plurality of cylindrical battery cells is improved, and the reliability is further improved.

In this process, the flow rate of cooling liquid can be increased, the time difference between different cooling plate assemblies 100 and the temperature difference between different cooling plate assemblies 100 can be reduced to meet the temperature drop cooling requirement of cylindrical battery cells under the condition of high rate discharge.

For convenience of description, the connectors 1 of the cooling plate assembly 100 located at both ends are defined as the head-end connector and the tail-end connector, respectively.

For example, the third flow channel 113 of the head-end connector and the tail-end connector are simultaneously set as liquid inlet, and the fourth flow channel 114 of the head-end connector and the tail-end connector are simultaneously set as liquid outlet; Or, the fourth flow channel 114 of the head-end connector and the tail-end connector are set for liquid inlet at the same time, and the third flow channel 113 of the head-end connector and the tail-end connector are set for liquid outlet at the same time, so that the liquid inlet and the liquid outlet are increased, the circulation speed of the cooling liquid is increased, and the cooling effect is improved. Of course, it is also possible to perform liquid inlet and liquid outlet alternately, that is, the fourth flow channel 114 of the head-end connector and the end-end connector are set as liquid inlet at the same time, and the third flow channel 113 of the head-end connector and the tail-end connector are set for liquid outlet at the same time. After a preset time interval of half an hour, the third flow channel 113 of the head-end connector and the fourth channel 114 of the head-end connector and the tail-end connector are set as liquid outlet at the same time.

For example, the third flow channels 113 and the fourth flow channels 114 of the head-end connector and the third flow channels 113 and the fourth flow channels 114 of the tail-end connector block any one of the third flow channel 113 and any one of the fourth flow channels. Among the other third flow channel 113 and the fourth flow channel 114, one is set to communicate with the external liquid inlet device, and the other is arranged to communicate with the external liquid outlet device; The number of connections with that external liquid storage device and the external collection device is reduced, and the structure is simplified.

In this embodiment, the third flow channel 113 and the fourth flow channel 114 of the head-end connector are blocked, and the third flow channel 113 and the fourth flow channel 114 of the tail-end connector are respectively communicated with the outside, and the external liquid storage device and the external collection device can both be located on the side of the liquid cooling module near the end connector, which is convenient for the structural arrangement. For example, a solenoid valve may be provided to control the third flow channel 113 to communicate with one of the external liquid storage device and the external collection device, and control the fourth flow channel 114 to communicate with the other of the external liquid storage device and the external collection device. For example, the first water pipe and the second water pipe can be connected at the same time on the third flow channel 113, and the third water pipe and the fourth water pipe can be connected at the same time on the fourth flow channel 114. The first water pipe and the third water pipe are connected to the external liquid storage device, and the second water pipe and the fourth water pipe are connected to the external collecting device. The first water pipe, the second water pipe, the third water pipe and the fourth water pipe are respectively provided with solenoid valves for on/off. When the solenoid valves on the first water pipe and the fourth water pipe are connected at the same time, and the solenoid valves on the second water pipe and the third water pipe are disconnected at the same time, the third channel 113 is set as liquid inlet and the fourth channel 114 is set as liquid outlet; When the solenoid valves on the first water pipe and the fourth water pipe are disconnected at the same time, the solenoid valves on the second water pipe and the third water pipe are connected at the same time, so that the third flow channel 113 is set as liquid outlet and the fourth flow channel 114 is set as liquid inlet. In other embodiments, the solenoid valves can be connected in other ways, without limitation.

In other embodiments, the external liquid storage device and the external collecting device may be arranged on both sides of the liquid cooling module to respectively block the third flow channel 113 of the head-end connector and the fourth channel 114 of the tail-end connector, so that the fourth channel 114 of the head-end connector and the third channel 113 of the tail-end connector are respectively communicated with the outside. Or the third flow channel 113 of the end connector and the fourth flow channel 114 of the head connector are respectively blocked, so that the fourth flow channel 114 of the end connector and the third flow channel 113 of the head connector are respectively communicated with the outside. Prevent cooling liquid leakage by blocking.

As an alternative embodiment, the liquid cooling module further comprises a liquid inlet control valve assembly and a liquid outlet control valve assembly. The third flow channel 113 and the fourth flow channel and 114 of the connector 1 of the cooling plate assembly 100 located at one end are connected to the external liquid storage device through the liquid inlet control valve assembly, and the liquid inlet control valve assembly can make one of the third flow channel 113 and fourth flow channel 114 communicate with the external liquid storage device and the other be blocked. The liquid module also includes a liquid outlet control valve assembly, the third flow channel 113 and the fourth flow channel 114 of the connector 1 of the cooling plate assembly 100 located at the other end are connected to the external collecting device through liquid outlet control valve assembly, and the liquid outlet control valve assembly can make one of the third flow channel 113 and the fourth flow channel 114 communicate with the external collecting device and the other be blocked; When the liquid inlet control valve assembly connects the third channel 113 with the external liquid storage device, the liquid outlet control valve assembly connects the fourth channel 114 with the external collecting device. Or when the liquid inlet control valve assembly makes the fourth flow channel 114 communicate with the external liquid storage device, the liquid outlet control valve assembly makes the third flow channel 113 communicate with the external collecting device. By controlling the liquid inlet control valve assembly and the liquid outlet control valve assembly, the flow direction of the cooling liquid in the cooling pipe assembly 2 is controlled, which makes the cooling of the cylindrical battery cell more uniform and easier to control. In other embodiments, it may be blocked by a plug, which is not limited.

For example, in this embodiment, the liquid inlet control valve assembly is a two-position three-way solenoid valve (not shown in the figure), two outlets of the liquid inlet control valve assembly are connected to the third flow channel 113 and the fourth flow channel 114 respectively, and the inlet of the liquid inlet control valve assembly is connected to an external liquid storage device; For example, the two-position three-way solenoid valve is a one-in two-out valve. In this embodiment, the liquid outlet control valve assembly is a two-position three-way solenoid valve (not shown in the figure). The two inlets of the liquid outlet control valve assembly are connected to the third flow channel 113 and the fourth flow channel 114, respectively, and the outlet is connected to an external collecting device. For example, the two-position three-way solenoid valve is a two-in and one-out valve.

In other embodiments, the liquid inlet control valve assembly includes two direct-acting solenoid valves (not shown in the figure), the outlets of the two direct-acting solenoid valves are respectively communicated with the third flow channel 113 and the fourth flow channel 114, and the inlets of which are both connected to an external liquid storage device; In other embodiments, the liquid outlet control valve assembly includes two direct-acting solenoid valves (not shown in the figure), the inlets of which are respectively communicated with the third flow channel 113 and the fourth flow channel 114, and the outlets of which are both connected to an external collecting device.

For example, as shown in FIG. 2, the connector 1 is hexahedral. The connector 1 is provided with a first flow channel 111 and a second flow channel 112 penetrating along the first direction, and a third flow channel 113 and a fourth flow channel 114 penetrating along the second direction. The connector 1 has a regular structure, is convenient for processing and assembly, reduces the production cost, and occupies a small space.

For example, the connector 1 is further provided with a plug 12, which can connect the third flow channel 113 of two adjacent connectors 1 and the fourth flow channel 114 of two adjacent connectors 1 respectively. The plug 12 is arranged between two adjacent cooling plate assemblies 100, and together with the connector 1, it forms a first cooling fluid channel and a second cooling liquid channel respectively. Each connector 1 is connected with another connector 1 through its own plug 12, the plug 12 facilitates the connection between different connectors 1, and improves the assembly efficiency of adjacent cooling plate assemblies 100.

In this embodiment, as shown in FIG. 2, two plugs are arranged between adjacent connectors 1, which are respectively connected to the third flow channel on the opposite side of the two connectors and the fourth flow channel on the opposite side of the two connectors.

For example, when the height of the cylindrical cell is large, a plurality of groups of cooling plate assemblies can be arranged along the third direction for cooling the cylindrical battery cell. Optionally, when a plurality of the cooling plate assemblies are arranged along the third direction, two adjacent groups of the cooling plate assemblies are sequentially connected along the third direction through the connector 1, thus improving the structural connection reliability.

The embodiment provides a battery pack, which includes a liquid cooling module, wherein the liquid cooling module is arranged to cool a cylindrical battery cell. By adopting the liquid cooling module, the battery has a better cooling effect, improves the space utilization rate, improves the energy density, simplifies the structure, reduces the overall weight, is convenient to assemble, and has the advantage of rapid batch production. For example, the cylindrical battery cells are arranged according to the maximum space utilization rate, and the size, angle and shape of the liquid cooling module are arranged according to the arrangement of the cylindrical battery cells, which can be adjusted according to the changes of the diameter and height of the cylindrical cells, thus having high adaptability.

For example, there is at least one group of liquid cooling modules. When there are multiple groups of liquid cooling modules, multiple groups of liquid cooling modules are arranged in the third direction, and two adjacent groups of liquid cooling modules are connected by the connector 1. For example, as shown in FIG. 5, a plurality of cooling plate assemblies are arranged in the second direction to form a layer, and when a layer of cylindrical cells is arranged, a layer of cooling plate assemblies is arranged to cool a layer of cylindrical battery cells; When multiple layers of cylindrical battery cells are arranged, each layer of cylindrical battery cells is cooled by a layer of cooling plate assembly, and in the multi-layer cooling plate assembly, the connectors 1 of each layer are connected with the connectors 1 of the other layer, which ensures the stable connection of the mechanical structure and improves the connection reliability. The number of groups of liquid cooling modules can be set according to the space size, and without limitation.

The invention claimed is:

1. A cooling plate assembly, including:
a connector provided with at least one group of cooling flow channels, and each group of the cooling flow channels includes a first flow channel and a second flow channel penetrating along a first direction (x), and the connector is further provided with a third flow channel and a fourth flow channel penetrating along a second direction (y), the first flow channel communicates with the third flow channel, and the second flow channel communicates with the fourth flow channel; and
two groups of cooling pipe assemblies arranged corresponding to each group of cooling flow channels, the two groups of cooling pipe assemblies are respectively arranged on both sides of the connector along the first direction (x), and the two groups of cooling pipe assemblies respectively communicate with the first flow channel and the second flow channel on the same side of the connector; and one of the third flow channel and the fourth flow channel is a liquid inlet and the other is a liquid outlet, wherein each group of the cooling pipe assemblies includes:
a first cooling pipe and a second cooling pipe, wherein a first end of the first cooling pipe is connected to the first flow channel, and a first end of the second cooling pipe is connected to the second flow channel; and
a liquid collecting pipe, wherein a second end of the first cooling pipe and a second end of the second cooling pipe are respectively connected to the liquid collecting pipe.

2. The cooling plate assembly according to claim 1, wherein the third flow channel and the fourth flow channel alternate as the liquid inlet and the liquid outlet.

3. The cooling plate assembly according to claim 2, wherein the cooling pipe assembly has an outer surface provided with a heat conductive structure layer.

4. The cooling plate assembly according to claim 2, wherein two ends of the connector along the third direction (z) are respectively provided with connecting members, and two connectors can be connected by the connecting members.

5. The cooling plate assembly according to claim 1, wherein the first flow channel and the second flow channel are arranged along a third direction (Z) of the connector.

6. The cooling plate assembly according to claim 1, wherein a plurality of pipes are respectively arranged in the first cooling pipe and the second cooling pipe.

7. The cooling plate assembly according to claim 1, wherein the first cooling pipe and the second cooling pipe are both serpentine pipes, and the serpentine pipes have a shape matching a cylindrical battery cell.

8. The cooling plate assembly according to claim 5, wherein the cooling pipe assembly has an outer surface provided with a heat conductive structure layer.

9. The cooling plate assembly according to claim 5, wherein two ends of the connector along the third direction (z) are respectively provided with connecting members, and two connectors can be connected by the connecting members.

10. The cooling plate assembly according to claim 1, wherein the cooling pipe assembly has an outer surface provided with a heat conductive structure layer.

11. The cooling plate assembly according to claim 1, wherein two ends of the connector along the third direction (z) are respectively provided with connecting members, and two connectors can be connected by the connecting members.

12. A liquid cooling module, including a plurality of the cooling plate assemblies as claimed in claim 1, wherein the plurality of the cooling plate assemblies are sequentially connected-along the second direction (y) by the connector, the third flow channels of the plurality of the cooling plate assemblies communicate to form a first cooling liquid channel, and the fourth flow channel of the plurality of the cooling plate assemblies communicate to form a second cooling liquid channel.

13. The liquid cooling module according to claim 12, wherein the connectors of two cooling plate assemblies at two ends of the plurality of cooling plate assemblies are sequentially connected and are a head-end connector and a tail-end connector, respectively;

one of the third flow channel and the fourth flow channel of the head-end connector and one of the third flow channel and the fourth flow channel of the tail-end connector block the third flow channel of one of the head-end connector and the tail-end connector, the third flow channel of the other of the head-end connector and the tail-end connector communicates with one of an external liquid inlet device and an external liquid outlet device, and one of the fourth flow channels of the head-end connector and the tail-end connector communicates with the other of the external liquid inlet device and the external liquid outlet device.

14. The liquid cooling module as claimed in claim 13, wherein the third flow channel and the fourth flow channel of the head-end connector are both blocked, and the third flow channel and the fourth flow channel of the tail-end connector respectively communicate with the external liquid inlet device and the external liquid outlet device; or the third flow channel and the fourth flow channel of the tail-end connector are both blocked, and the third flow channel and the fourth flow channel of the head-end connector respectively communicate with the external liquid inlet device and the external liquid outlet device.

15. The liquid cooling module according to claim 12, wherein the connectors are also provided with plugs, and the plugs respectively connect the third flow channels of two adjacent connectors and the fourth flow channels of two adjacent connectors.

16. The liquid cooling module as claimed in claim 15, wherein first ends of the third flow channel and the fourth flow channel on one side of one of the two adjacent connectors are respectively fixedly connected with the first ends of the plugs, and second ends of the plugs are detachably connected to second ends of the third flow channel and the fourth flow channel of the other one of the two adjacent connectors, respectively.

17. The liquid cooling module according to claim 12, wherein the plurality of the cooling plate assemblies are arranged along the third direction, and two adjacent groups of the cooling plate assemblies are sequentially connected along the third direction through the connector.

18. A battery pack comprising the liquid cooling module according to claim 12.

19. The battery pack according to claim 18, comprising multiple groups of the liquid cooling modules arranged along the third direction (z), and two adjacent groups of the liquid cooling modules are connected by the connector.

\* \* \* \* \*